(12) United States Patent
Caro et al.

(10) Patent No.: US 7,039,863 B1
(45) Date of Patent: May 2, 2006

(54) COMPUTER GENERATION OF DOCUMENTS USING LAYOUT ELEMENTS AND CONTENT ELEMENTS

(75) Inventors: Perry A. Caro, San Jose, CA (US); Joseph Pasqua, Menlo Park, CA (US); Daniel C. Brotsky, Berkeley, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 09/360,399

(22) Filed: Jul. 23, 1999

(51) Int. Cl.
*G06F 15/00* (2006.01)

(52) U.S. Cl. ...................................... 715/530; 715/500

(58) Field of Classification Search ................ 715/530, 715/531, 500, 517
See application file for complete search history.

(56) References Cited

U.S. PATENT DOCUMENTS

| | | | |
|---|---|---|---|
| 5,323,312 A * | 6/1994 | Saito et al. ................. | 715/513 |
| 5,459,827 A * | 10/1995 | Allouche et al. ............ | 715/513 |
| 5,644,776 A | 7/1997 | DeRose et al. .............. | 395/761 |
| 5,845,304 A * | 12/1998 | Iijima .......................... | 715/530 |
| 5,878,421 A * | 3/1999 | Ferrel et al. ................. | 707/100 |
| 5,895,476 A * | 4/1999 | Orr et al. ...................... | 715/517 |
| 5,907,837 A * | 5/1999 | Ferrel et al. ..................... | 707/3 |
| 6,012,071 A * | 1/2000 | Krishna et al. .............. | 715/522 |
| 6,014,680 A * | 1/2000 | Sato et al. ................... | 715/513 |
| 6,016,520 A * | 1/2000 | Facq et al. ..................... | 710/33 |
| 6,023,714 A * | 2/2000 | Hill et al. .................... | 715/513 |
| 6,026,417 A * | 2/2000 | Ross et al. ................... | 715/517 |
| 6,029,182 A * | 2/2000 | Nehab et al. ................ | 715/523 |
| 6,038,567 A * | 3/2000 | Young ..................... | 707/103 R |
| 6,041,303 A * | 3/2000 | Mathews ........................ | 705/1 |
| 6,046,818 A * | 4/2000 | Benson ...................... | 358/1.18 |
| 6,065,012 A * | 5/2000 | Balsara et al. .............. | 707/102 |
| 6,101,513 A * | 8/2000 | Shakib et al. ................ | 715/527 |
| 6,137,483 A * | 10/2000 | Kiyono et al. ............ | 715/500.1 |
| 6,177,933 B1 * | 1/2001 | Young .......................... | 345/805 |
| 6,199,082 B1 * | 3/2001 | Ferrel et al. ................. | 715/522 |
| 6,212,534 B1 * | 4/2001 | Lo et al. ...................... | 715/511 |
| 6,230,173 B1 * | 5/2001 | Ferrel et al. ................. | 715/513 |
| 6,279,013 B1 * | 8/2001 | LaMarca et al. ............ | 715/500 |
| 6,314,213 B1 * | 11/2001 | Miyahara et al. ........... | 382/312 |
| 6,374,271 B1 * | 4/2002 | Shimizu et al. .......... | 715/501.1 |
| 6,377,956 B1 * | 4/2002 | Hsu et al. ................. | 707/104.1 |
| 6,401,097 B1 * | 6/2002 | McCotter et al. ........... | 707/102 |
| 6,424,978 B1 * | 7/2002 | Liu et al. .................. | 715/501.1 |
| 6,480,866 B1 * | 11/2002 | Mastie ........................ | 715/525 |
| 6,507,848 B1 * | 1/2003 | Crosby et al. .............. | 707/102 |
| 6,507,858 B1 * | 1/2003 | Kanerva et al. ............ | 715/515 |
| 6,547,831 B1 * | 4/2003 | Kueny ........................ | 715/522 |
| 6,567,850 B1 * | 5/2003 | Freishtat et al. ............ | 709/224 |

(Continued)

FOREIGN PATENT DOCUMENTS

DE      196 53 435 A      6/1998

(Continued)

OTHER PUBLICATIONS

Haralick, Document Image Understanding:geometric and logical layout, IEEE 1994, pp. 385-390.*

(Continued)

*Primary Examiner*—Cong-Lac Huynh
(74) *Attorney, Agent, or Firm*—Fish & Richardson P.C.

(57) ABSTRACT

Bindings are used to describe a document (and a different document) by associating content elements with layout elements, the layout elements defining layout features or placement information to be applied to the associated content elements in the document, the bindings being stored separately from both the content and layout elements.

19 Claims, 8 Drawing Sheets

U.S. PATENT DOCUMENTS

| | | | | |
|---|---|---|---|---|
| 6,596,032 | B1* | 7/2003 | Nojima et al. | 715/517 |
| 6,631,498 | B1* | 10/2003 | McCauley et al. | 715/517 |
| 6,701,308 | B1* | 3/2004 | Chen et al. | 707/3 |
| 6,738,155 | B1* | 5/2004 | Rosenlund et al. | 358/1.15 |
| 6,826,534 | B1* | 11/2004 | Gupta et al. | 705/1 |
| 6,826,727 | B1* | 11/2004 | Mohr et al. | 715/517 |
| 2002/0002569 | A1* | 1/2002 | Nguyen et al. | 707/515 |

FOREIGN PATENT DOCUMENTS

| | | |
|---|---|---|
| EP | 0 578 207 A2 | 1/1994 |
| EP | 0 814 425 A2 | 12/1997 |
| WO | WO 98 10356 A | 3/1998 |

OTHER PUBLICATIONS

Bennett et al., Transformations on a Dialog Tree : Rule-Based Mapping of Content to Style, ACM 1989, pp. 67-75.*

Nichols, Softscape Introduces Softscape Explorer Plus, Business Wire, May 20, 1996, p. 1, 6 pgs.*

Borchers et al., Getting It Across Layout Issues for Kiosk Systems, SIGCHI Bulletin Oct. 1995, pp. 68-74.*

Wiecha et al., Separating Content from Form : A Language for Formatting On-Line Documentation and Dialog, ACM 1986, pp. 1-7.*

Variable-data printing comes of age: capabilities & market demand converge. Seybold Report Publishing System, Sep. 15, 1997, vol. 27, No. 2, pp. 2-34.

Web authoring and conversion tools. Seybold Report of Internet Publishing, May 1997, vol. 1, No. 9, pp. 12(4).

Web Publishing Systems. The Seybold Report on Internet Publishing, Nov. 1997, vol. 2, No. 3, pp. 6-14.

Walter, Mark and Liora Alshuler. Intranet Vendors Shake up the Market at Documentation. The Seybold Report on Publishing Systems, Apr. 7, 1997, vol. 26, No. 13, p. 3-14.

PlanetSaver. http://wwww.treehuggers.xyz.

http://www.netobjects.com/html/products.html.

http://www.netobjects.com/support/usage_notes/html/data_publishing.html.

http://domino.lotus.com/.

http://www.lotus.com/notes/.

http://chilepepper.lotus.com/.

http://www.odi.com/products/onweb/overview.html.

http://www.knowledgeview.co.uk/.

http://www.seyboldreport.com/OldHotStories/970213.htm.

http://www.informix.com/informix/corpinfo/zines/whitprs/illuswp/dblade.htm.

http://www.informix.com/.

http://www.bitstrea.com/products/developer/nudoc/index.html.

Web publishing systems. The Seybold Report on Internet Publishing, Nov. 1997, vol. 2, No. 3, p. 6(8).

Clyman, John. Face-off. PC Magazine, vol. 16, No. 20, p. 100(11). Nov. 18, 1997.

Newsbytes News Network. France—Web Consortium Develops Enhanced Web Technology, Nov. 5, 1997.

Heid, Jim. Improving your Web Typography, part 2. Macworld, Oct. 1997, vol. 14, No. 10, pp. 115, 117.

* cited by examiner

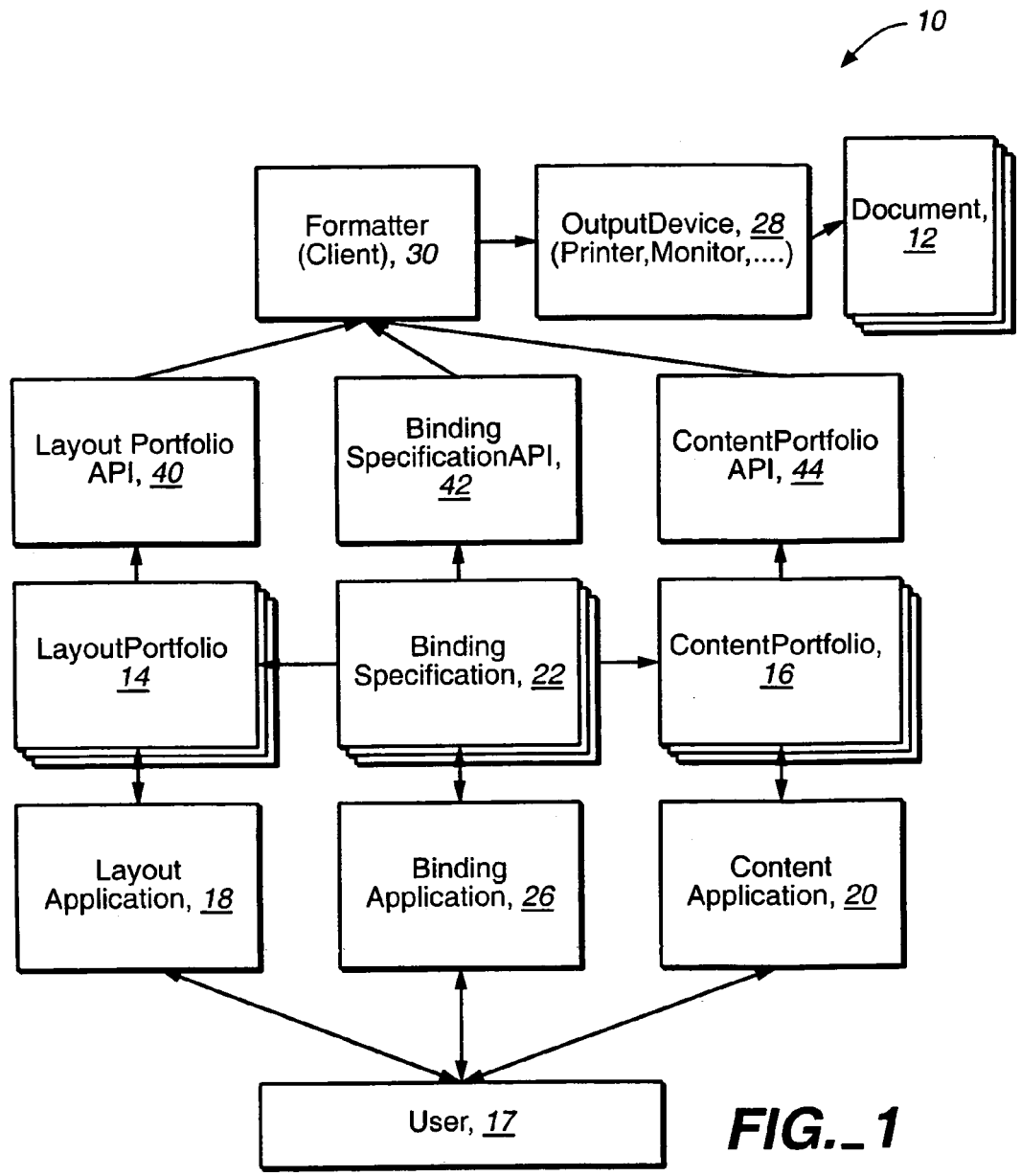
FIG._1

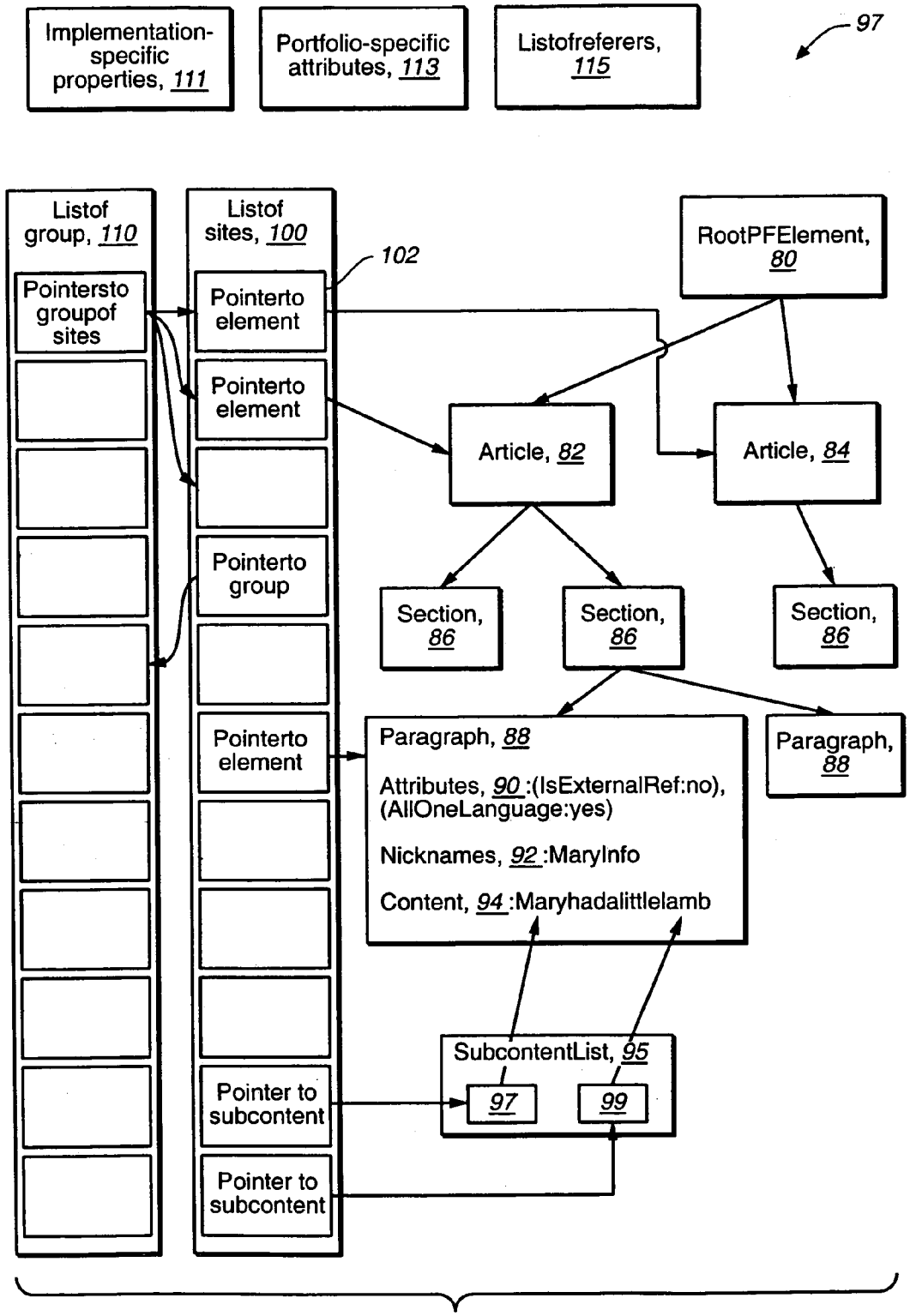
FIG._2

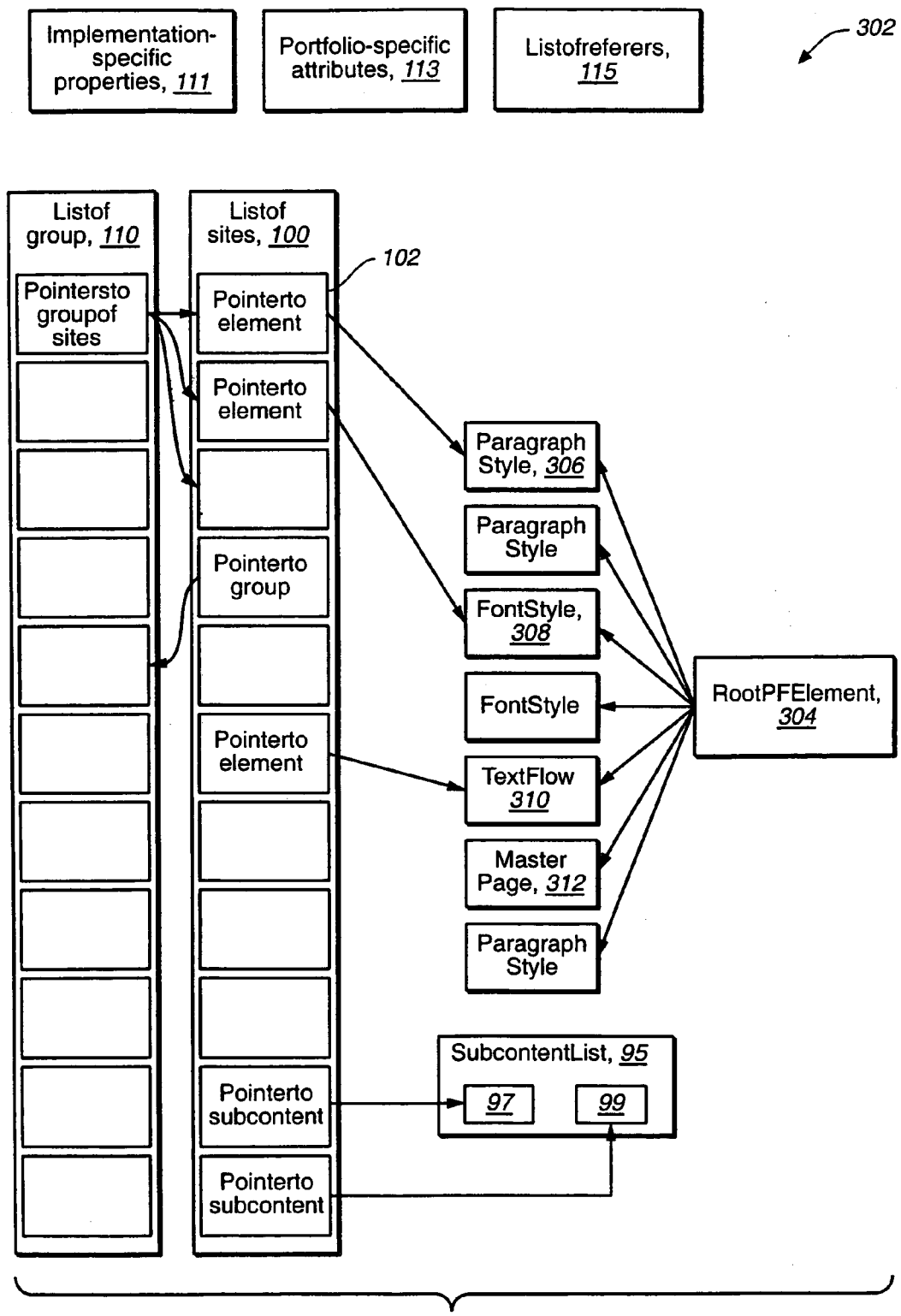
FIG._3

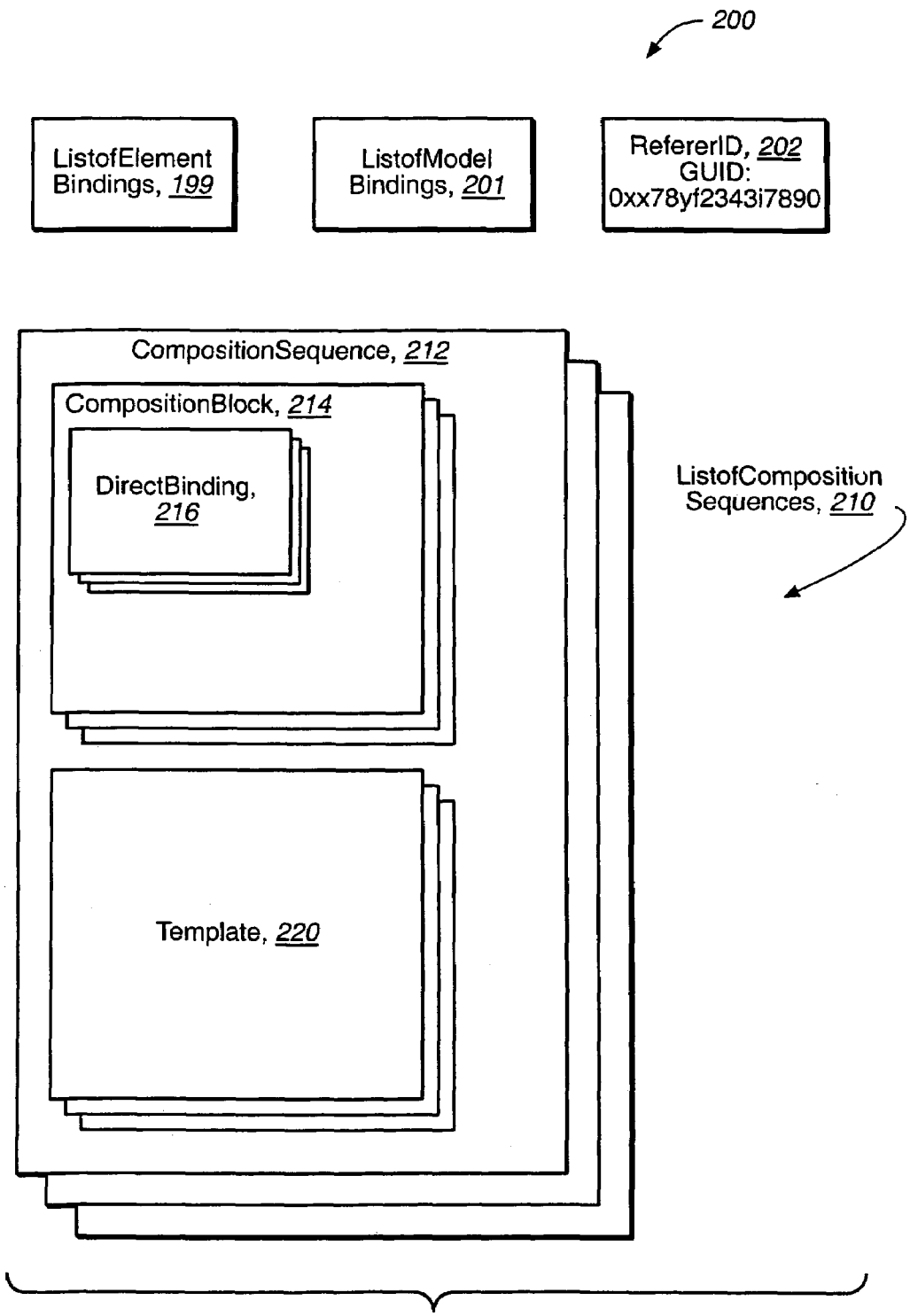
FIG._4

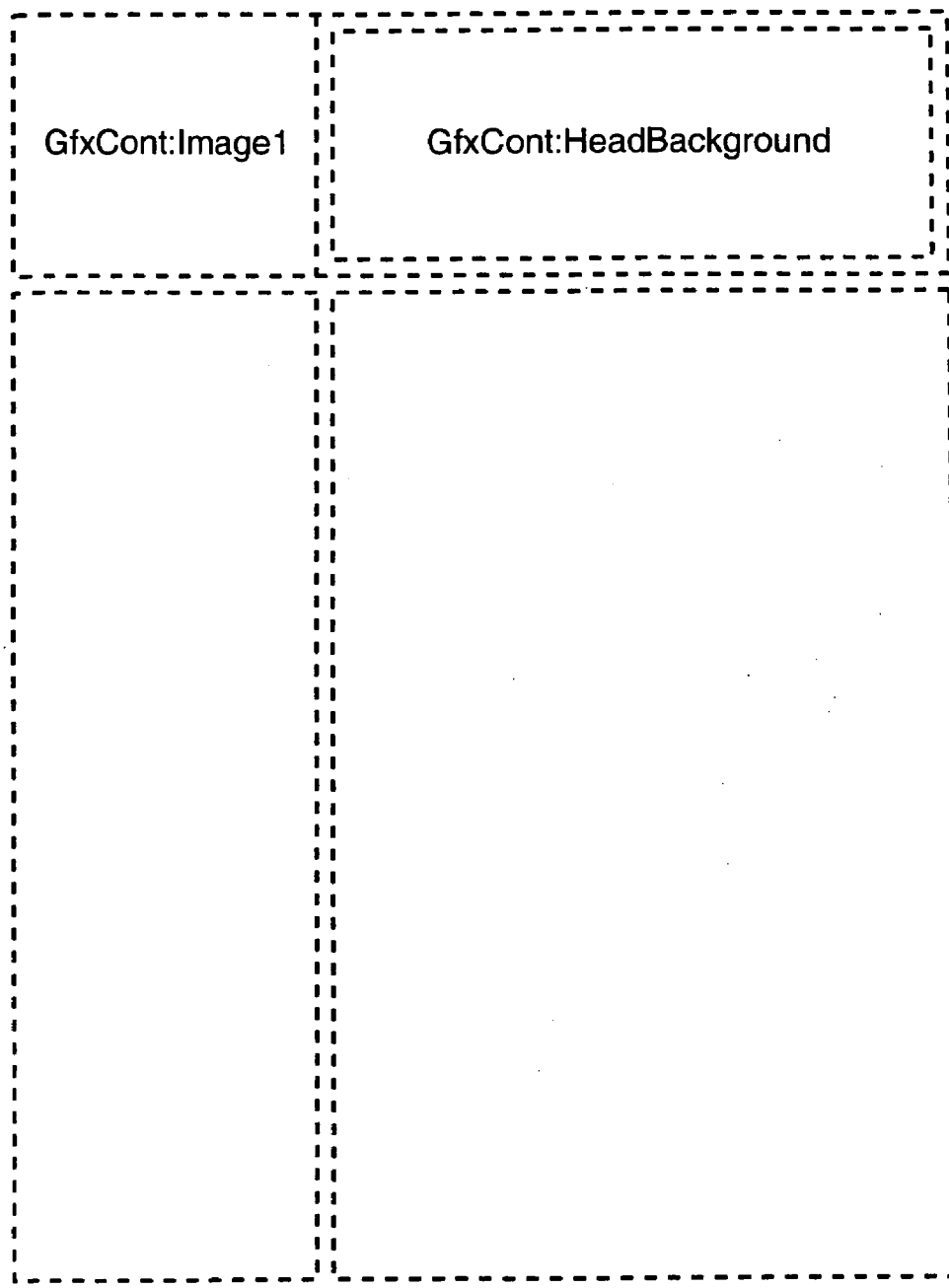
FIG._5A

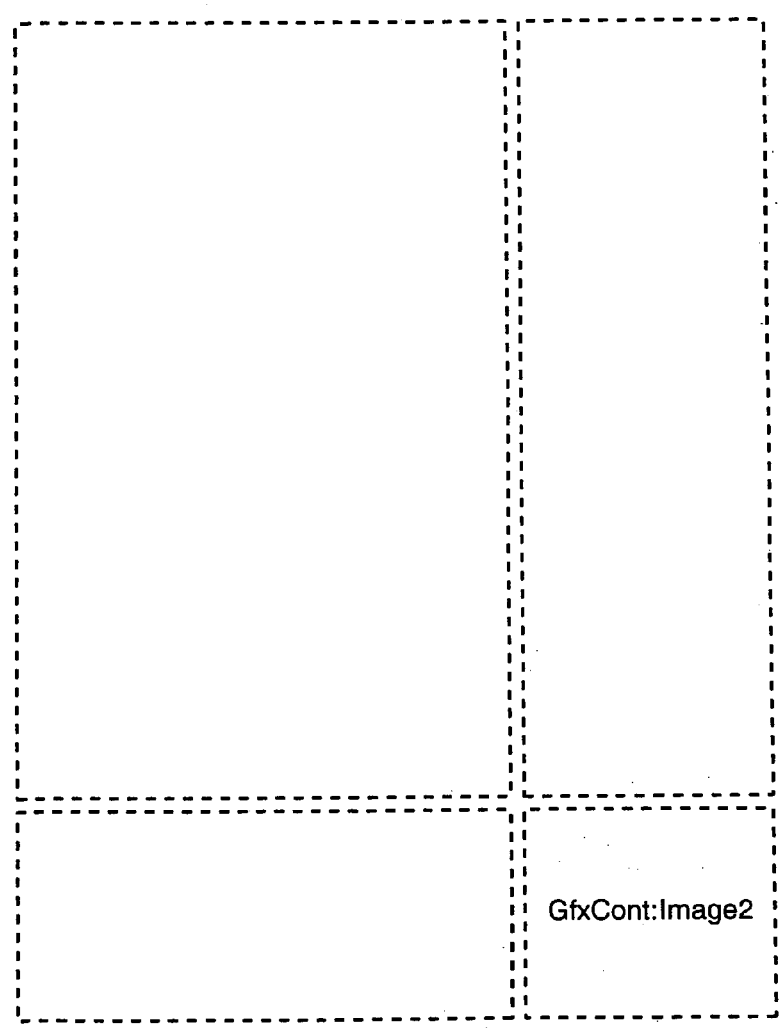
FIG._5B

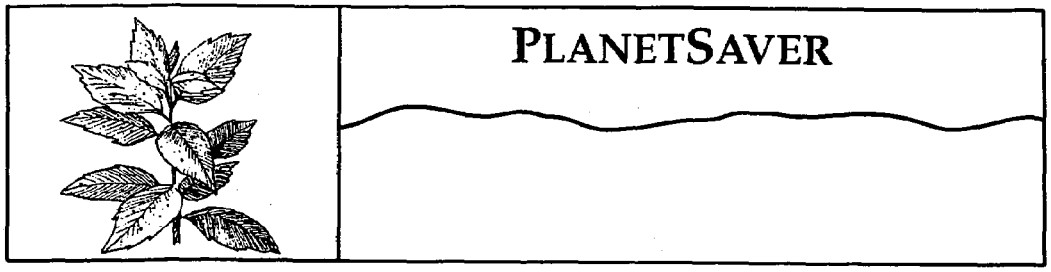

PLANETSAVER

Some background:

Understanding the limitations of man-made products, we set out to develop products that were made strictly from the four basic elements. After years of development, we did just that. PlanetSaver items are 95% earth, air, fire and water - the stuff of legends and of good environmental policies.

Our products not only perform the most exacting specifications, they do so without harming the planet which we, and lots of other furry creatures, call home. This lets you have the products you want, a clear conscience, and clean planet all at the same time. We call this progress in the truest sense.

With our items on the market we are that much closer to preserving our precious resources.

PlanetSaver International is the company for environmentally-minded people who are also budget-minded. Our products are made from all natural sources like earth, wind, fire and air. That's right - every PlanetSaver product you buy is made from the stuff of ancient Greek mythology. There's not one thing in our products that has a multisyllabic name. Only the most pure dirt, the swiftest wind, the hottest fire, and the cleanest air. Ingredients any consumer can be proud of.

PlanetSaver doesn't just make products a mother would be proud of, we make products that mother earth would enjoy. Take our dirt-based soap products. Rather than try to wash away dirt with harsh chemicals, PlanetSaver's BlendIn AntiSoap is just more pure dirt that well make those dirty spots on your clothes just fade into the background. We don't fight against nature, we work with it for you.

What's more, PlanetSaver International doesn't just make products for the home, we make products for the home office right up to the insensitive corporate behemoth.

Our products distinguish themselves in so many ways from those of our competitors. For example, take our manufacturing processes. Our BlendIn AntiSoap is made by trained environmentalists who gather dirt in an earth-safe way and caringly place it in recycled or reused cardboard boxes.

And lets talk about being cruelty-free. At PlanetSaver International we never test our products on animals. We don't have to! The basic ingredients of our products are in use by animals all over the world today. Take for example, dirt. Can you think of any animal the doesn't like dirt? I don't think so. And what about air? Even fish like air and we've got it!

Our products are a blend of good old mother nature and good old American ingenuity and marketing magic. You can feel

FIG._6A good about yourself and the environment by using products made from little more than dirt, and at the same time you can support a great company like ours. It's a win-win-win situation. If you look at it in that light, you'll ask yourself why it's taken you so long to become a member of the PlanetSaver family.

We have so many great products that we can't list them all here. We can only scratch the surface. Some of our best-sellers include Planet Saver InstaLight and PlanetSaver ThirstQuencher. InstaLight consists of a miracle of nature and fire, in a convenient, safe, portable and easy to use form. How is this possible you might ask?

Well, we provide a small container of natural, and we stress the word natural, gas along with a flint and stone striker system that lets you take fire anywhere you want to be. Some people think this is nothing more than a simple lighter - a product that's been around for decades. Well, technically it is, but now you can have peace of mind knowing that it comes from us. We make fire clean.

That brings us back to one of our favorite products. Our ThirstQuencher is more than just another bottle of water. It's a bottle of water from PlanetSaver so you know its pure. You can feel safe pouring it down a sewer grate because you know that is where it came from to begin with - the Earth. We don't even filter it - if it's good enough for the other animals it's OK by us.

Visit your local PlanetSaver distributor to learn more about our exciting new line of PlanetSaver products. You won't be sorry you did.

How does BlendIn stack up against other cleaning products?

Weight. BlendIn is approximately 15% lighter than an equivalent soap product.

Price. In larger quantities, BlendIn is only 3-5% more expensive than soap.

Lifetime. BlendIn will live as long as your clothes do. We guarantee it.

Warranty. We warranty BlendIn for the life of your clothes. You can't go wrong.

Environmental Impact. BlendIn uses reclaimed materials from other manufacturing processes. It is a very low impact product.

Customization. With thousands of choices, BlendIn is as unique as you are.

---

We at PlanetSaver do our utmost to make not only outstanding products that we can stand behind, but we also strive to give you the information you need to make an informed choice. You can get more information directly from our website, www.treehuggers.xyz, or by visiting a PlanetSaver distributor in your area.

While we do our best to be completely accurate at all times, we can not be held responsible for topographical errors here, or in our website. To confirm any information about our products, call us directly at 1 (800) 555-DIRT.

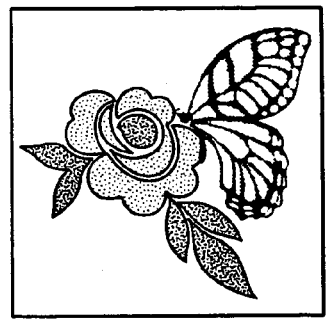

FIG._6B

COMPUTER GENERATION OF DOCUMENTS USING LAYOUT ELEMENTS AND CONTENT ELEMENTS

BACKGROUND

This invention relates to computer generation of documents using layout elements and content elements.

Background

Computer generated human-readable documents, for example, exhibit a wide range of forms including those appearing on paper or other "tangible" media and others that are only temporarily displayed on "intangible" media like the display surfaces of computer monitors.

Tangible documents range from full-color press-printed high-volume books, magazines, and commercial literature to multiple-color laser-printed medium-volume items to one-of-a-kind black-and-white pages printed on personal computer printers. Intangible documents include web pages that are received by telecommunication from a central source, screen displays that are generated by software running on local networks or individual workstations, and digitally-generated video frames.

Human-readable documents include content such as words, numbers, pictures, animations, and video. The content is presented in a way that reflects layout features. Layout features can include the styles in which content is presented (e.g., font, size, shape, color) and the locations and arrangements of elements on pages of a document.

When traditional printing was the predominant method for producing documents, a document tended to have a fixed content and layout. More recently, using computer software, it has become easier to create documents that share common content but different layouts (for example, a web page and a printed sales sheet that have identical texts) or a common layout but different content (different sales sheets that share a common appearance but pertain to different products in a product line).

A document that is created in software typically is stored in a file that captures the layout and content of the document. When the document is to be produced in a tangible or intangible form, a formatter uses the information contained in the document description file to generate the document in a format suitable for the target medium.

Layout and content both have structure. With respect to layout, for example, a box containing an image may contain another image box. Or the layout may require that two text boxes appear side by side on the page. Text has structure that, for example, defines the order of letters or words, or the grouping of sentences in paragraphs. When the formatter generates a document from a document description file, it sometimes must resolve conflicts between structure associated with the content and structure associated with the layout.

Early software tended to mingle content and layout features of a document in the document description file. For example, the text content could be interspersed with escape codes that shifted fonts or redefined the locations of characters.

In more recent software products, the document description files provide a sharper separation between content and layout features. This separation enables a user to make changes to layout without affecting the content (e.g., to change all uses of Times-Bold font in a document to Helvetica-Bold) or to work with the content without changing the layout (e.g., to search the text for a particular string). These recent software products are either content-centric or layout-concentric.

Content-centric software, such as Microsoft Word, emphasizes content in the description files and supplements the content with layout features as needed. The user creates and manipulates text largely independently of the layout. Layout features are added to the text either manually by the user or automatically by the program.

Layout-centric software, such as Adobe's PageMaker7, emphasizes layout features, such as placement of content elements on a page, in the document description files. The user creates and manipulates layout elements. Content is added to the layout-structured document as needed.

The creation of some documents is strongly content-oriented (e.g., a legal brief) or strongly layout oriented (e.g., an advertisement). For other documents, the creation process is a hybrid effort combining both content-centric and layout-centric tasks. In a magazine page that contains an article next to an advertisement, for example, the content may be the focus in creating the article while the layout may be the focus in creating the advertisement.

SUMMARY

In general, in one aspect, the invention features enabling storage of bindings that describe a document by associating content elements with layout elements, the layout elements defining layout features or placement information to be applied to the associated content elements in the document, the bindings being stored separately from both the content and layout elements.

Implementations may include one or more of the following features.

Other stored bindings may describe another, different document by associating at least one of the content elements with at least one of the layout elements, at least one layout element defining layout features or placement information to be applied to at least one corresponding content element in the different document. The bindings for the different document may be stored separately from the bindings for the document and separately from the content and layout elements.

We use the term "documents" in a broad sense to include not only human readable documents but also a wide variety of other kinds of presentations, including audio and video productions, multimedia, graphics, and synthesized speech (in which, for example, the words comprise the "content" and the intonation the "layout"). The term "document" also includes sets of information that relate to documents, such as job tickets, database tables that define documents, tables of contents, indexes, and summaries.

Implementations of the invention may include one or more of the following features. The bindings may provide a primary control for the generation of the document and the different document. The document and the different document are generated using the elements and bindings. At least some of the layout elements and at least some of the content elements are identified by uniquely named binding sites. The content elements and the layout elements are stored separately in portfolios. Some of the bindings are layout-centric and some of the bindings are content-centric. In some case the bindings for the document and the different document may be the same and at least one of the content elements and layout elements associated with the binding sites may be different for the document and the different document. Or the bindings may be different and at least some of the content elements and the layout elements are the same.

In general, in another aspect of the invention, an application program is used to create content elements (or layout elements) for use in documents. The content elements (layout elements) are stored in a format native to the application program. Based on the stored content elements (layout elements) a content portfolio (layout portfolio) is formed by storing unique binding site names associated with respective content elements (layout elements) and information that aids a formatter in generating documents based on the content elements (layout elements) and on layout elements (content elements) stored in a layout portfolio (content portfolio).

Implementations of the invention may include one or more of the following features. The information that aids the formatter includes attributes associated with the content elements. The content portfolio (layout portfolio) includes implementation specific properties and portfolio-specific attributes. A binding specification, which refers to the content elements, is also stored. The content portfolio (layout portfolio) also includes a list of binding sites of elements belonging to the content portfolio (layout portfolio) and a list of groups of content elements (layout elements) belonging to the content portfolio (layout portfolio).

In general, in another aspect of the invention, a binding specification is created for use in formatting documents based on the binding specification, content elements referenced by the binding specification, and layout elements referenced by the binding specification. The binding specification includes composition sequences that aid the formatter in formatting documents, the composition sequences defining the order in which formatting is to proceed using bindings between content elements and layout elements. The binding specification stores global bindings and direct bindings that aid the formatter in formatting documents.

Implementations of the invention may include one or more of the following features. The global bindings may include a list of element bindings that define a default binding for elements of a specified type. The global bindings include a list of model bindings that define a default model for a specified binding site. The binding specification contains composition sequences that aid the formatter in formatting documents, the composition sequences defining the order in which formatting is to proceed using bindings between content elements and layout elements. Each of the composition sequences includes composition blocks containing ordered lists of direct bindings. Each of the direct bindings comprises a placement binding or a style binding.

The invention also includes a medium storing a content portfolio or a layout portfolio or a binding specification.

In general, in another aspect, the invention features processing binding elements that comprise placement bindings before binding elements that comprise style bindings.

In general, in another aspect, the invention features determining whether the layout should be dominated by the layout components or the layout aspects of the content components.

Among the advantages of the invention are one or more of the following. The invention enables document design that efficiently handles both content-centric and layout-centric composition. Content elements and layout elements may be reused. Different application file formats may be accommodated.

Other advantages and features will become apparent from the following description and from the claims.

DESCRIPTION OF THE DRAWINGS

FIG. 1 is a block diagram of a system for machine generation of human readable documents.
FIG. 2 is a block diagram of a content portfolio.
FIG. 3 is a block diagram of a layout portfolio.
FIG. 4 is a block diagram of a binding specification.
FIGS. 5A and 5B illustrate a layout portfolio.
FIGS. 6A and 6B illustrate a document based on the layout portfolio.

DESCRIPTION OF THE PREFERRED EMBODIMENTS

As seen in FIG. 1, in a system 10 for computer generation of human readable documents, information about the content of a document 12 to be printed or displayed, and information about the layout of the document, are stored separately. For example, they could be stored in separate files called a layout portfolio 14 and a content portfolio 16. The portfolios are generated by a user 17 interacting with, respectively, a layout application 18 and a content application 20.

"Content" includes text, images, figures, tables, and layout information that is intrinsic to the content (such as the order of words in a paragraph). "Layout" includes fonts, paragraph styles, page layout, formatting, kerning, and placement, and content that is intrinsic to the layout information. An example of content that is intrinsic to layout would be text used for decoration, for which the shapes of the letters are more important than what the words spell. Another example is a graphic used as a border or frame around a page.

The content application may be an existing word processor or illustration program or any other application that is used to generate content for documents. The layout application could be an existing page layout program or any other application that is used to generate layouts for documents. Alternatively, the layout and content applications could be written for the specific purpose of creating content and layout portfolios. The layout and content applications could be combined as a single application and the layout and content portfolios could be parts of a single stored file provided that the elements of the portfolios are separately accessible in a manner described later.

The information stored in the content portfolio does not need to describe the relationship of that information to the information stored in the layout portfolio nor vice versa. Rather, the interrelationship of the content and layout information is defined by a stored binding specification 22. The binding specification is generated by a user interacting with a binding application 26.

Just as a user authors a content portfolio 16 using a content application 20 and authors a layout portfolio 14 using a layout application 18, the user also authors a binding specification 22 using a binding application 26. While working with the binding application, the user is able to identify content elements and layout elements and to specify the interrelationships between them.

As will be explained in more detail below, the binding specification contains a list of binding operations. Each binding operation refers to one or more content elements stored in the content portfolio and to one or more layout elements stored in the layout portfolio and specifies an operation that relates the content to the layout. The references are made by identifying binding sites associated with the respective layout and content elements. Each element of content (e.g., a paragraph of text) or layout (e.g., a style sheet) is identified by a binding site that is essentially a unique identifier or name.

The content elements and layout elements required by a binding specification may be contained in more than one portfolio if the binding site names can be uniquely addressed by the binding specification.

The information contained in the content portfolio may be stored in a file format that is typical of the file format of the application used to generate it. Similarly, the information contained in the layout portfolio may be stored in a file format that is typical of the file format of the application used to generate it. In these cases, software APIs are used to present the application file format data as standard portfolio data to formatting and binding applications.

Once a binding specification has been created for a document and the layout and content elements named in it are available in content and layout portfolios, one or more documents (identical or different) can be generated for an output device 28 such as a printer, a monitor, or a video storage element. The documents are generated by a formatter 30 that processes the binding operations of the binding specification using the stored content and layout elements cited in the binding operations.

The interaction of the formatter 30 with the layout and content portfolios and the binding specification occur through application programming interfaces (APIs) 40, 42, 44 for the layout portfolio, content portfolio, and binding specification. The purpose of the APIs is to enable a single formatter to use a common protocol to handle possibly different formats of the layout portfolio, the content portfolio, and the binding specification.

The output of the formatter is a data stream appropriate to drive the printer, monitor, or other output device.

The binding specification contains information that tells the formatter how to resolve conflicts between layout features that may be present in content elements and content features that may be present in layout elements. As an example of a layout feature present in a content element, and how it may be resolved, suppose an image box is 2"×2" and the content bound to that layout element by the binding specification is 3"×3". The binding specification can specify that the size dictated by the layout element should take precedence, and the content changed (scaled down) accordingly.

Because content elements are handled independently of layout elements and because a separate binding specification is used to define the relationships between layout elements and content elements, a user may create content without paying much attention to the layout that may use it. Similarly, the user may create a layout without much concern for the content that is to fill it. Furthermore this independent authoring can be handled differently for different portions of a given document.

The binding specification operations include placement directives that indicate where content is to be placed and style directives that tell how content is to appear. Because the binding specification can draw from independently available content and layout elements, the specification can be partially layout-centric and partially content-centric under the control of the user who generates the binding specification. Consequently, the user can generate documents that have both content-centric and layout-centric portions.

A single binding specification can be used to create more than one different document by simply changing one or more of the content or layout elements that are associated with the binding sites named in the specification. In that sense, the binding specification defines a logical document rather than an actual document with the actual content and layout determined by the underlying material that is referred to by the binding site names. Furthermore, different documents can be created from a given binding specification by substituting different entire portfolios of layout and content provided that the content and layout elements that they contain have the binding site names referred to in the binding specification.

Also, content and layout elements can be used to generate different documents by creating different binding specifications that refer to those same elements.

The same layout elements can be bound in a single way, represented by a single binding specification, to create different documents based on different contents. The same content can be bound in different ways to different layout elements using different bindings to create different documents. And the same content can be bound to many different layouts using a single binding.

Content and layout elements have a recursive structure as do binding sites and binding operations. Generally, a content portfolio cannot refer to a layout portfolio or vice versa. Content portfolios may have internal links to other content portfolios and layout portfolios may have internal links to other layout portfolios.

Content Portfolio

As shown in FIG. 2, the content of a content portfolio 97 is expressed in a tree of portfolio element objects beginning at a root element called Root portfolio (PF) element 80. Examples of the tree elements include the texts of articles 82, 84, sections of the articles 86 and paragraphs of sections 88. A paragraph element 88 could contain attribute information 90 (e.g., the fact that the language of the text is French), a nickname 92, and content information 94, such as the sentence "Mary had a little lamb." The content information could be further specified as a list 95 of sub-content element pointers, 97, 99, which point to pieces of the content of a paragraph element. The purpose of the nickname is to allow users to optionally include an informal description of a portfolio element. This can help at binding time. When confronted with an element name such as "mi38798-2383", a human might find it convenient to have an informal description to understand what the element is, so that a correct binding can be made, for example, "A line from a nursery rhyme".

The portfolio includes a list 100 of binding sites 102 each of which contains a pointer that associates the binding site with one of the elements in the tree. In the example, a site could point to an article, a paragraph, an item of subcontent, or to a group of elements.

As seen in FIG. 2, a list of groups 110 can be provided. Each group defines a group of binding sites of content elements that may go together. Groups allow collections of elements to be formed regardless of their positions in the hierarchical structure of the portfolio. For example, suppose Article1 contains a heading and three paragraphs while Article2 contains a heading and four paragraphs. In a table of contents, the headings may be listed using a single reference by forming a group of the binding sites for the headings in Article1 and Article2.

The content portfolio also stores implementation-specific properties 111 that are pertinent to a class or kind of portfolio rather to an individual specific portfolio. For example, portfolios of a particular kind may have a maximum nickname length of 16 characters and a maximum length for names of attributes of 32 characters. The content portfolio also stores portfolio specific attributes 113 that are peculiar to a given portfolio. An attribute may be whether the "source" is embedded (yes or no). "Embedded source=yes" means the data for the content elements is included in the same file as the portfolio data. "Embedded source=no" means the content data is located elsewhere and is referred to by reference from the portfolio data. Another attribute may be whether restrictions are stored (yes or no). A list of referers 115 contains a list of the globally unique IDs of every object (such as a binding specification) that refers to this portfolio. Here and elsewhere, globally unique means unique within the scope specified in a given implementation. Each content element is characterized by an attribute (for example, whether there is an external reference or whether the element is in AllOneLanguage), a nickname (such as "Hamlet's Query"), and the content of the element, such as the text "To be or not to be?"

FIG. 2 illustrates the logical structure of the content portfolio. The actual data structures and file formats could vary. The data structures and logical organization should be used consistently in all of the portfolios. A similar logical structure is used for layout portfolios as described below.

The content application must be able to create a hierarchy of content elements of the kind suggested in FIG. 2, the list of sites, and the list of groups based on information provided by the user. When a conventional content application, such as a word processor, is used, the tree, list of sites, list of groups, implementation-specific properties, portfolio-specific attributes, and list of referers are created by including the additional data in the existing application file format. This is achieved with software that implements the API mentioned earlier. The API can implement exactly the list of required data structures and operations (such as getting and setting properties and attributes) implied by those structures.

An example of a content portfolio for a brochure is set forth below as an XML document consisting of articles, headings, sections, paragraphs, and image references. Some of these have binding sites that are referenced in the binding specification that is set forth below. The binding site identifiers appear after the letters BS in certain sections of the portfolio.

```
<BASICCONTENT>
    <RIDS>
        <RID RIDINT)EX="2" VAL="ImgApp"/>
        <RID RIDINDEX="1" VAL="85DE1C45-2C66-101B-B02E-04021C009402"/>
    </RIDS>
    <GROUPS>
    <GROUP>
            <BS RIDINDEX="1" UID="ItemHeads"/>
            <MEMBER RIDINDEX="1" UID="IID10"/>
            <MEMBER RIDINDEX="1" UID="IID11"/>
        <MEMBER RIDINDEX="1" UID="IID12"/>
        <MEMBER RIDINDEX="1" UID="IID13"/>
        <MEMBER RIDINDEX="1" UID="IID14"/>
        <MEMBER RIDINDEX="1" UID="IID15"/>
    </GROUP>
    </GROUPS>
    <DOCATTRS/>
    <FlowTxtCModel.ARTICLE>
    <BS RIDINDEX="1" UID="FiberSaverBrochure"/>
    <FlowTxtCModel.HEADING>
<BS RIDINDEX="1" UID="Heading"/>
<TxtCModel.TEXT>PlanetSaver International Products<SS
        RIDINDEX="1" UID="SML1" BEGIN="13" END="26"
        HINT="International"/>
        </TxtCModel.TEXT>
    </FlowTxtCModel.HEADING>
    <FlowTxtCModel.SECTION>
        <BS RIDINDEX="1" UID="FiberSaverOverview"/>
        <FlowTxtCModel.PARA>
            <TxtCModel.TEXT>Some background:</TxtCModel.TEXT>
        </FlowTxtCModel.PARA>
        <FlowTxtCModel.PARA>
            <TxtCModel.TEXT>Understanding the limitations of man-made products, we set
out to develop products that were made strictly from the four basic elements. After years of development,
we did just that. PlanetSaver items are 95% earth, air, fire, and water - the stuff of legends and of good
environmental policies.</TxtCModel.TEXT>
        </FlowTxtCModel.PARA>
        <FlowTxtCModel.PARA>
            <TxtCModel.TEXT>Our products not only perform to the most exacting
specifications, they do so without harming the planet which we, and lots of other furry creatures, call
home. This lets you have the products you want, a clear conscience, and clean planet all at the same time.
We call this progress in the truest sense.</TxtCModel.TEXT>
        </FlowTxtCModel.PARA>
        <FlowTxtCModel.PARA>
            <TxtCModel.TEXT>With our items on the market we are that much closer to
preserving our precious resources.</TxtCModel.TEXT>
        </FlowTxtCModel.PARA>
    </FlowTxtCModel.SECTION>
    <FlowTxtCModel.SECTION>
        <BS RIDINDEX="1" UID="MainBody"/>
        <FlowTxtCModel.PARA>
            <TxtCModel.TEXT>PlanetSaver International is the company for
```

-continued environmentally-minded people who are also budget-minded. Our products are made from all natural source like earth, wind, fire, and air. That's right - every PlanetSaver product you buy is made from the stuff of ancient Greek mythology. There's not one thing in our products that has a multisyllabic name. Only the most pure dirt, the swiftest wind, the hottest fire, and the cleanest air. Ingredients any consumer can be proud of.</TxtCModel.TEXT>
    </FlowTxtCModel.PARA>
    <FlowTxtCModel.PARA>
        <TxtCModel.TEXT>PlanetSaver doesn't just make products a mother would be proud of, we make products that mother earth would enjoy. Take our dirt-based soap products. Rather than try to wash away dirt with harsh chemicals, PlanetSaver's BlendIn AntiSoap is just more pure dirt that will make those dirty spots on your clothes just fade into the background. We don't fight against nature, we work with it for
        you.</TxtCModel.TEXT>
    </FlowTxtCModel.PARA>
    <FlowTxtCModel.PARA>
        <TxtCModel.TEXT>What's more, PlanetSaver International
        doesn't just make products for the home, we make products for
        the home office right up to the insensitive corporate
        behemoth.</TxtCModel.TEXT>
    </FlowTxtCModel.PARA>
    <FlowTxtCModel.PARA>
        <TxtCModel.TEXT>Our products distinguish themselves in so
        many ways from those of our competitors. For example, take
        our manufacturing processes. Our BlendIn AntiSoap is made by
        trained environmentalists who gather dirt in an earth-safe
        way and caringly place it in recycled or reused cardboard
        boxes.</TxtCModel.TEXT>
    </FlowTxtCModel.PARA>
    <FlowTxtCModel.PARA>
        <TxtCModel.TEXT>And lets talk about being cruelty-free. At
        PlanetSaver International we never test our products on
        animals. We don't have to! The basic ingredients of our
        products are in use by animals all over the world every day.
        Take for example, dirt. Can you think of any animal that
        doesn't like dirt? I didn't think so. And what about air?
        Even fish like air and we've got it!</TxtCModel.TEXT>
    </FlowTxtCModel.PARA>
    <FlowTxtCModel.PARA>
        <TxtCModel.TEXT>Our products are a blend of good old mother
        nature and good old American ingenuity and marketing magic.
        You can feel good about yourself and the environment by using
        products made from little more than dirt, and at the same
        time you can support a great company like ours. It's a
        win-win-win situation. If you like at it in that light,
        you'll ask yourself why it's taken you so long to become a
        member of the PlanetSaver family.</TxtCModel.TEXT>
    </FlowTxtCModel.PARA>
    <FlowTxtCModel.PARA>
    <TxtCModel.TEXT>We have so many great products that we can't
list them all here. We can only scratch the surface. Some of
our best-sellers include PlanetSaver InstaLight and
PlanetSaver ThirstQuencher. InstaLight consists of a mircale
of nature, fire, in a convenient, safe, portable and easy to
use form. How is this possible you might
ask?</TxtCModel.TEXT>
    </FlowTxtCModel.PARA>
    <FlowTxtCModel.PARA>
        <TxtCModel.TEXT>Well, we provide a small container of
        natural, and we stress the word natural, gas along with a
        flint and stone striker system that lets you take fire
        anywhere you want to be. Some people think this is nothing
        more than a simple lighter - a product that's been around for
        decades. Well, technically it is, but now you can have piece
        of mind knowing that it comes from us. We make fire
        clean.</TxtCModel.TEXT>
    </FlowTxtCModel.PARA>
    <FlowTxtCModel.PARA>
        <TxtCModel.TEXT>That brings us back to one of our other favorite products.
Our ThirstQuencher is more than just another bottle of water. It's a bottle of water from
        PlanetSaver so you know its pure. You can feel safe pouring it down a sewer grate
because you know that is where it came from to begin with - the Earth. We don't even filter it - if it's good
enough for the other animals it's OK by us./TxtCModel.TEXT>
    </FlowTxtCModel.PARA>
    <FlowTxtCModel.PARA>
        <TxtCModel.TEXT>Visit your local PlanetSaver distributor to learn more about
our exciting new line of PlanetSaver products. You won't be sorry you did.</TxtCModel.TEXT>
    </FlowTxtCModel.PARA>
  </FlowTxtCModel.SECTION>
  <FlowTxtCModel.SECTION>

-continued

```
        <BS RIDINDEX="1" UID="FiberSaverComparison"/>
        <FlowTxtCModel.HEADING>
            <BS RIDINDEX="1" UID="IID1"/>
            <TxtCModel.TEXT>How does BlendIn stack up against other cleaning
products?</TxtCModel.TEXT>
        </FlowTxtCModel.HEADING>
        <FlowTxtCModel.PARA>
            <BS RIDINDEX="1" UID="IID10"/>
            <TxtCModel.TEXT>Weight</TxtCModel.TEXT>
        </FlowTxtCModel.PARA>
        <FlowTxtCModel.PARA>
            <TxtCModel.TEXT>BlendIn is approximately 15% lighter than an equivalent
soap product.</TxtCModel.TEXT>
        </FlowTxtCModel.PARA>
        <FlowTxtCModel.PARA>
            <BS RIDINDEX="1" UID="IID11"/>
            <TxtCModel.TEXT>Price</TxtCModel.TEXT>
        </FlowTxtCModel.PARA>
        <FlowTxtCModel.PARA>
            <TxtCModel.TEXT>In large quantities, BlendIn is only 3–5% more expensive
than soap.</TxtCModel.TEXT>
        </FlowTxtCModel.PARA>
        <FlowTxtCModel.PARA>
            <BS RIDINDEX="1" UID="IID12"/>
            <TxtCModel.TEXT>Lifetime</TxtCModel.TEXT>
        </FlowTxtCModel.PARA>
        <FlowTxtCModel.PARA>
            <TxtCModel.TEXT>BlendIn will live as long as your clothes do. We guarantee
it</TxtCModel.TEXT>
        </FlowTxtCModel.PARA>
        <FlowTxtCModel.PARA>
            <BS RIDINDEX="1" UID="IID13"/>
            <TxtCModel.TEXT>Warranty</TxtCModel.TEXT>
        </FlowTxtCModel.PARA>
        <FlowTxtCModel.PARA>
            <TxtCModel.TEXT>We warranty BlendIn for the life of your clothes. You can't
go wrong.</TxtCModel.TEXT>
        </FlowTxtCModel.PARA>
        <FlowTxtCModel.PARA>
            <BS RIDINDEX="1" UID="IID14"/>
            <TxtCModel.TEXT>Environmental Impact</TxtCModel.TEXT>
        </FlowTxtCModel.PARA>
        <FlowTxtCModel.PARA>
            <TxtCModel.TEXT>BlendIn uses reclaimed materials from other manufacturing
processes. It is a very low impact
            product.</TxtCModel.TEXT>
        </FlowTxtCModel.PARA>
        <FlowTxtCModel.PARA>
            <BS RIDINDEX="1" UID="IID15">
            <TxtCModel.TEXT>Customization<TxtCModel.TEXT>
        </FlowTxtCModel.PARA>
        <FlowTxtCModel.PARA>
            <TxtCModel.TEXT>With thousands of choices, BlendIn is as unique as you
are.</TxtCModel.TEXT>
        </FlowTxtCModel.PARA>
    </FlowTxtCModel.SECTION>
    <FlowTxtCModel.SECTION>
        <BS RIDINDEX="1" UID="Details"/>
        <FlowTxtCModel.PARA>
            <TxtCModel.TEXT>We at PlanetSaver do our utmost to make not only
outstanding products that we can stand behind, but we also strive to give you the information you need to
make an informed choice. You can get more information directly from our website,
www.treehuggers.xyz, or by visiting a PlanetSaver distributor in your area.</TxtCModel.TEXT>
        </FlowTxtCModel.PARA>
        <FlowTxtCModel.PARA>
            <TxtCModel.TEXT>While we do our best to be completely accurate at all times,
we can not be held resposnible for typographical errors here, or in our website. To confirm any
information about our products, call us directly at 1 (800) 555-DIRT.</TxtCModel.TEXT>
        </FlowTxtCModel.PARA>
    </FlowTxtCModel.SECTION>
</FlowTxtCModel.ARTICLE>
<Model.REFERENCE UID="Wilderness"
PORTFOLIO_REF="file:///D:/DEV/TestCases/Demo/Brochure/Images/Wilderness/Wilderness.ddf"
RID="Brochure">
    <BS RIDINDEX="1" UID="WildPlace"/>
</Model.REFERENCE>
<RasterGfxCModel.RASTER
REF="file://D:/DEV/TestCases/Demo/Brochure/Images/ButterflyLeft.gif"><BS
RIDINDEX="1" UID="CornerImgLeft"/>
```

```
    </RasterGfxCModel.RASTER>
    <RasterGfxCModel.RASTER
        REF="file://D:/DEV/TestCases/Demo/Brochure/Images/ButterflyRight.gif"><BS
        RIDINDEX="1" UID="CornerImgRight"/>
    </RasterGfxCModel.RASTER>
</BASICCONTENT>
```

Even though a number of images are referenced at the end of the content, they appear in various places in the formatted output, not only at the end. The binding specification pulls them out (based on their binding sites) and places them explicitly.

Layout Portfolio

As seen in FIG. 3, the layout portfolio 302 includes a list of groups 110 and a list of binding sites 100 that are like the ones in the content portfolio. The information in the layout portfolio is expressed, as in the content portfolio, as a tree of portfolio elements beginning at a Root portfolio (PF) element 304. As in the case of the content portfolio, the entire tree is accessible through the root element. As shown, some elements are also the targets of pointers in binding sites. Examples of layout elements include paragraph styles 306, font styles 308, text flows 310, and master pages 312.

Layout portfolios also contain implementation-specific properties 111, portfolio-specific attributes 113, and a list of referers 115, that are similar to the ones in the content portfolios discussed above. For example, the implementation-specific properties may specify which version of the layout application was used to generate this layout portfolio, and the portfolio-specific attributes may specify where font files are located.

The layout application must be able to create a hierarchy of layout elements of the kind suggested in FIG. 3, the list of sites, and the list of groups based on information provided by the user. When a conventional layout application, such as a page layout program, is used, the tree, list of sites, list of groups, implementation-specific properties, portfolio-specific attributes, and list of referers are created by including the additional data in the existing application file format. This is achieved with software that implements the APIs mentioned earlier. The APIs may implement exactly the list of required data structures and operations (such as getting and setting properties and attributes) implied by those structures.

An example of a layout portfolio (for the brochure associated with the content portfolio set forth above and the binding specification set forth below) is shown in FIGS. 5A and 5B. The brochure covers a two-page spread. An alternative layout portfolio could arrange the brochure onto one portrait page. This layout portfolio is shown as it would appear on screen and is based on the FrameMaker7 file format, although other file formats could be used. The outlined areas are specifications of the layout geometry. Within the layout portfolio, the style specifications, like paragraph and character styles, are carried in standard FrameMaker style elements. All of the geometry and style elements are referenced in an index section. This index describes the binding sites that are visible to the clients (e.g., the formatter) and how they relate to internal FrameMaker elements. The index for the layout portfolio is set forth below. Each of the elements in the index assigns a binding site and in some cases additional parameters to an internal FrameMaker object like a Frame (which provides geometry information) or a style (which says how something should look—e.g., the font to use).

```
<FRAMELAYOUT>
    <RIDS>
        <RID RIDINDEX="1" VAL="85DE1C45-2C66-101B-B02E-04021C009402"/>
    </RIDS>
    <ELEMENT IID="ParaStyle.SmallBody" >
        <BS RIDINDEX="1" UID="SmallBody"/>
    </ELEMENT>
    <ELEMENT IID="ParaStyle.Body" >
        <BS RIDINDEX="1" UID="Body"/>
    </ELEMENT>
    <ELEMENT IID="ParaStyle.HeadingRunIn" >
        <BS RIDINDEX="1" UID="HeadingRunIn"/></ELEMENT>
    <ELEMENT IID="ParaStyle.Heading1">
        <BS RIDINDEX="1" UID="Heading1"/>
    </ELEMENT>
    <ELEMENT IID="ParaStyle.Title">
        <BS RIDINDEX="1" UID="Title"/>
    </ELEMENT>
    <ELEMENT IID="CharStyle.18pt">
        <BS RIDINDEX="1" UID="18pt"/>
    </ELEMENT>
    <ELEMENT IID="CharStyle.SmallCaps">
        <BS RIDINDEX="1" UID="SmallCaps"/>
    </ELEMENT>
    <ELEMENT IID="AnchorStyle.RunIn">
        <BS RIDINDEX"1" UID="AFRunIn"/>
    </ELEMENT>
    <ELEMENT IID="AnchorStyle.Inline">
        <BS RIDINDEX="1" UID="AFInline"/>
```

-continued

```
    </ELEMENT>
    <ELEMENT IID="Flow.Sidebar1">
        <BS RIDINDEX="1" UID="Sidebar1"/>
    </ELEMENT>
    <ELEMENT IID="Flow.Sidebar2">
        <BS RIDINDEX="1" UID="Sidebar2"/>
    </ELEMENT>
    <ELEMENT IID="Flow.Main">
        <BS RIDINDEX="1" UID="Main"/>
    </ELEMENT>
    <ELEMENT IID="Flow.FinePrint">
        <BS RIDINDEX="1" UID="FinePrint"/>
    </ELEMENT>
    <ELEMENT IID="Flow.Heading">
        <BS RIDINDEX="1" UID="Heading"/>
    </ELEMENT>
    <ELEMENT IID="GfxCont.HeadBackground" FIT= "FitGraphicToFrame">
        <BS RIDINDEX="1" UID="HeadBackground"/>
    </ELEMENT>
    <ELEMENT IID="GfxCont.Image1" FIT="FitGraphicToFrame">
        <BS RIDINDEX"1" UID="Image1"/></ELEMENT>
    <ELEMENT IID="GfxCont.Image2" FIT="FitGrapbicToFrame">
        <BS RIDINDEX="1" UID="Image2"/>
    </ELEMENT>
</FRAMELAYOUT>
```

Binding Specification

As seen in FIG. 4, a binding specification 200 contains associations between binding sites in a content portfolio and binding sites in a layout portfolio. The main components of a binding specification are a list of element bindings 199, a list of model bindings 201, a referer ID 202, and a list of composition sequences 210.

The referer ID 202 is a globally unique ID of the binding specification. When the formatter is to look up a site in a content or layout portfolio, the formatter uses the ID of the portfolio.

The list of model bindings contains model bindings, each of which restricts a site to a given content or layout model, thus guaranteeing that a certain type of data will be found at the site. Using the API, the formatter can ask the portfolio what the model of a specified element is. If the model does not match what the model binding says, the formatter can display an error message to the user. For example, a model binding could provide that sites 12, 34, and 387 in a layout portfolio must be FontStyles. The model binding also specifies whether the site is in a content or layout portfolio.

The list of element bindings contains element bindings each of which maps content elements of a given type to one or more layout elements, styles in particular. For example, an element binding could map all content elements of the type PARAGRAPH to a layout element representing a particular paragraph style.

A binding specification contains an ordered list of composition sequences 212. Each composition sequence contains an ordered list of composition blocks 214. Each composition block contains an ordered list of bindings 216.

A direct binding 216 associates one or more sites of source elements with one or more sites of destination elements. For example, the binding could list source sites (10, 9123, and 45) and destination sites (6719, 893, and 6594). The source elements could be content elements and the destination elements could be a layout elements or vice versa. For example, a direct binding could indicate "place this content element (a picture) in this layout element (an image frame)".

There are two types of direct bindings: placement bindings and style bindings. Placement bindings "place" one or more content elements into one or more layout elements, such as placing text on a page. Style bindings assign one or more styles either to one or more content elements (font styles to text), or to one or more layout elements (new paragraph styles for page 3 and 4).

A template 220 associates a type of layout container (e.g., a specific master page of a layout portfolio) with information about when the container should be used (e.g., for first pages that appear on the right side of two page spreads). The syntax may be "Site (always in Layout): 6719; Usages: (FIRST, RIGHT)".

One implementation may store the binding specification structures in XML format but other formats could also be used.

An example of a binding specification follows:

```
<BindSpec>
    <Header>
        <Title>Example Binding Specification<Title>
        <RID>85DE1C45-2C66-101B-B02E-04021C009402</RID>
    </Header>
    <Global>
        <Elem name="FlowTxtCModel.PARA">
            <Site uid="Body"/>
        </Elem>
    </Global>
```

```
        <Direct>
            <Compose>
                <Block>
                    <Place src="WildPlace" dst="HeadBackground"/>
                    <Place src="CornerImgLeft" dst="Image 1" required="no"/>
                    <Place src="CornerImgRight" dst="Image2"/>
                    <Place src="Heading" dst="Heading"/>
                    <Place src="FiberSaverOverview" dst="Sidebar1"/>
                    <Place src="FiberSaverComparison" dst="Sidebar2"/>
                    <Place src="MainBody" dst="Main"/>
                    <Place src="Details" dst="FinePrint"/>
                    <Style dst="Heading" src="Title"/>
                    <Style dst="SML1" src="18pt"/>
                    <Style dst="Details" src="SmallBody"/>
                    <Style dst="IID1" src="Heading1"/>
                    <Style dst="ItemHeads" src="HeadingRunIn"/>
                </Block>
                <Templates>
                </Templates>
            </Compose>
        </Direct>
</BindSpec>
```

Most of the specification lists placements and style applications. The place elements describe where content elements should go. The style elements describe how the content should look. The global element specifies that all elements in the content whose Model is "FlowTxtCModel.PARA" should have the style "Body" applied to them. In other words, all paragraphs should use the Body style unless explicitly overridden by a more specific binding.

This binding specification is layout-oriented. It takes content and content elements and places them in predefined layout locations. Binding specifications can also be content-oriented or a mixture of both. A content-oriented binding specification would not specify the placement of each content element. Instead it would "pour" the content into layout templates that would grow as necessary (e.g. adding new pages) to accommodate the content.

Operation of Formatter

The formatter generates document pages by processing the binding specification. The formatter first extracts and stores any global bindings for later reference. These bindings only provide style information. The formatter then process the binding specification a composition sequence at a time in the order in which they appear in the binding specification. For each composition sequence, the formatter retrieves all contained composition blocks. If a given composition sequence contains more than one composition block with a placement binding, then those placements are processed in parallel. For example, a single composition sequence might contain two composition blocks each of which places an article in a separate column on the same page.

Within a composition block, all placement bindings are processed before any style bindings are processed. Placement bindings are processed in the order in which they appear in the block. A placement binding can either refer to a fixed layout element, like a text frame in a particular location on a particular page, or a location in a template (e.g. master page). In the former case, the content element is poured into the fixed container. New pages will not be added to accommodate the content. The content must fit in the container provided. In the latter case, a new page is created based on the template given in the binding specification and the content flows into the given container on the new page. Pages are added as necessary to accommodate the content.

After the placements are complete, the style bindings are applied to the content that was just placed. The style bindings of a given composition block can be processed in any order with the exception of styles applied to subcontent. Since subcontent ranges can overlap, the order in which these styles are applied is important. For example, a paragraph might contain the words "Mary had a little lamb". One subcontent element might refer to the words "had a little" while another refers to the words "little lamb". When styles are applied to these overlapping areas (e.g. 'make "had a little" blue' and 'make "little lamb" red'), the order of application is given in the binding spec and adhered to by the formatter.

In some situations, several style bindings of the same type might be applied to a single piece of content. The formatter must determine which of these styles is most closely bound to the content and apply that one. For example, a given paragraph might have a paragraph format, P1, bound to it directly. It may also have a different paragraph format, P2, indirectly bound to it by virtue of being part of a container that had P2 bound to it (e.g. the paragraph is part of a section that had P2 bound to it). It may also have another paragraph style, P3, bound to it with a global binding. The formatter maintains enough context to always be able to determine the closest binding.

Whenever the formatter processes a placement binding, it must examine the content object being placed, C, and determine whether there are placement bindings that refer to any of C's children. For example, a placement binding might tell the formatter to put a given article into a particular layout element (like a text box) and another placement binding in the same composition block might tell the formatter to put a particular paragraph, P, of C into a side bar text block. The formatter must recognize these situations and remove P from C while C is being placed. It places P when it gets around to processing the placement binding that refers to it. This is also true for explicitly placed subcontent as well.

A given piece of content can be placed both as part of it's parent and on its own by specifying placement bindings in different composition blocks.

FIGS. 6A and 6B show the output of the formatter using the binding specification and content and layout portfolio examples given above. In the upper right corner of FIG. 6A, a graphic was pulled into the background and a heading was laid over it.

APIs

Each of the elements in the content and layout portfolios may comply with a native format that is peculiar to the application that generated it and that is different from the native format of other layout and content applications. For each of the applications, the API of FIG. 1 enables the formatter to make use of the content and layout elements and the binding specification. Among the methods that may be implemented by each API are setting binding sites on content or layout elements,
    getting binding sites on content or layout elements,
    maintaining referential integrity of binding sites,
    instantiating a binding,
    enumerating the binding operations in a binding specification,
    editing content or layout elements or binding specifications,
    composing a document from a binding specification.

Content Models

In one implementation, the content in content elements that are included in a content portfolio must all comply with predefined content models. In one scheme, all content elements must be one of the following:

Text
    Flow Text
    Placed Text
Graphic
    Layered Graphic
    Multi-model Graphic (preview vs. artwork)
    Raster Graphic
    Vector Graphic
    3D Graphic
Dynamic Media (2D Animation)
    Video (also Layered Graphic and Raster Graphic)
    Audio (also Layered Graphic and Raster Graphic)

These models form a class hierarchy, with multiple inheritance. Each subclass is allowed to add more expression (more features) to the super-class, but must at least provide the same features as the super-class. An example of sub-classing might be Footnote Flow Text as a sub-class of Flow Text. Content elements may use any internal structure and representation, as long as that format can be mapped to one of the content model classes or subclasses.

The class hierarchy defines the scope of expression and constraints that apply to all elements. The base classes are predefined. New features can be defined by sub-classing. New base classes can be added although older formatters will not able to handle the new base classes until the formatters are upgraded.

For example, if a content creator wishes to express traditionally structured text (sections, paragraphs, quotes), he uses the flow text model or a subclass of it. If the content creator wishes to express multi-layered 2D graphics, he uses the layered graphic model. The content element implementation for a specific content native format (e.g., a text string in Microsoft Word file format) is mapped from the native format's model to one or more of the prescribed models, sub-classing as needed.

Elements may implement more than one model at a time. For example, a content element of a native Adobe Illustrator7 file may express itself as a vector or layered graphic or placed text. This content element may be easily used by a formatter that is designed to produce HTML output by treating the element as a Graphic super-class. The same element may be used by a formatter designed to generate FrameMaker files for printing by treating it as either a Graphic or Placed Text. The same element may be used by a full text indexer by treating it as Placed Text.

Layout Models

The same principle is used with layout components although they are somewhat more difficult to model.

The range of native layout representations is so large that effectively each native layout format defines its own model. Although the abstraction can be expressed at a higher level where there is universal commonality, doing so reduces the expressiveness of the layout elements to least-common-denominator features.

One arrangement of high level layout models includes:
Layout
Presentation (styles)
Dynamics Layout defines basic containers for contents and explicit placement directives (such as character by character adjustments, text on a curve).

Presentation describes basic presentation attributes (styles) for content, such as font, color, and size.

Dynamics describes how time or events affect the presentation, including animation, synchronization, triggers, and transitions.

A layout element that does not implement the dynamics model has a static presentation in the sense that the document does not change over time.

Each layout element implementation maps layout elements to corresponding content models. For example, the content flow text model needs placement, so a layout element maps appropriate placement containers to content flow texts (e.g., frames in FrameMaker). The content Flow Text model needs presentation styles, so the layout presentation model maps appropriate styles to the content flow Texts (paragraph and character styles in FrameMaker). The content Flow Text model also needs explicit placement information, so the layout model called layout maps appropriate placement information to content Flow Texts.

Clients

Clients of the APIs (e.g., the formatter) take an active role while content and layout elements provide services to support the features of the clients. The content and layout elements do not implement features directly (for example, a content element does not implement "formatSelf" or "drawSelf" methods). Clients ask elements for information as needed.

The content and layout elements must provide information in accordance with the models they claim to implement. Clients rely on the component implementations to do any mapping necessary to supply the information.

Other implementations are within the scope of the following claims.

For example, an application could be provided that would enable a user to create new content to match aspects of an existing binding specification.

Instead of providing a new special purpose formatter that would use the binding specification and content and layout elements to generate documents, it would be possible to use a formatter that already exists within another program, for example, the document formatter that is part of Microsoft Word. An new application would use the binding specification as the basis for driving the internal formatter to generate the documents.

Reference to Class Hierarchy Description

Appendix A contains a description of a class hierarchy for an implementation of the invention.

What is claimed is:

1. A machine-based method comprising
enabling storage of a binding specification that describes a document by associating individual content elements with individual layout elements for the document, the layout elements defining layout features or placement information to be applied to the associated content elements;
combining the content and layout elements according to at least one binding included in the binding specification to generate the document based on the binding specification, the content elements, and the layout elements, wherein the binding specification is stored separately from both the content and layout elements.

2. The method of claim 1 in which at least one other binding is included in a different binding specification that describes another, different document by associating at least one of the content elements with at least one of the layout elements, at least one layout element defining layout features or placement information to be applied to at least one corresponding content element in the different document, the binding specification for the different document being stored separately from the binding specification for the document and separately from the content and layout elements.

3. A machine-based method comprising:
enabling storage of a binding specification including at least one binding, the binding specification describing a document by associating individual content elements with individual layout elements, the layout elements defining layout features or placement information to be applied to the associated content elements,
combining the content elements, and the layout elements according to at least one binding included in the binding specification to generate the document based on the binding specification, the content elements, and the layout elements,
enabling storage of a different binding specification including at least one binding, the different binding specification describing another, different document by associating at least one of the individual content elements with at least one of the individual layout elements, the at least one layout element defining layout features or placement information to be applied to the corresponding at least one content element in the different document, the different document being generated based on the different binding specification, the content elements, and the layout elements, the binding specification and the different binding specification being stored separately from the content elements and separately from the layout elements.

4. The method of claim 1 or 3 in which the at least one binding provides a primary control for the generation of the document and the different document.

5. The method of claim 2 or 3 further comprising enabling generation of the document and the different document using the elements and the at least one binding in the binding specification.

6. The method of claim 1 or 3 further comprising enabling storage of the content elements and the layout elements.

7. The method of claim 1 or 3 in which at least some of the layout elements and at least some of the content elements are identified by uniquely named binding sites.

8. The method of claim 1 or 3 in which the content elements are stored in a portfolio and the layout elements are stored in a separate portfolio.

9. The method of claim 1 or 3 wherein the binding specification includes a plurality of bindings and in which some of the bindings are layout-centric and some of the bindings are content-centric.

10. The method of claim 2 or 3 in which the binding specification for the two documents are the same and at least one of the content elements and layout elements associated with the binding sites is different for the document and the different document.

11. The method of claim 2 or 3 in which the binding specification for the two documents are different and at least some of the content elements and the layout elements are the same for the document and the different document.

12. A medium storing a machine-readable program that enables storage of a binding specification that includes bindings that describe a document by associating individual content elements with individual layout elements, the layout elements defining layout features or placement information to be applied to the associated content elements when the content and layout elements are combined according to at least one binding included in the binding specification to generate the document, the document being generated based on the binding specification, the content elements, and the layout elements, the binding specification being stored separately from both the content and layout elements.

13. A medium storing a machine-readable program that:
enables storage of a binding specification that includes bindings that describe document by associating individual content elements with individual layout elements for the document, the layout elements defining layout features or placement information to be applied to the associated content elements;
combines the content and layout elements according to at least one binding included in the binding specification to generate the document based on the binding specification, and
enables storage of a different binding specification including at least one binding, the different binding specification describing another, different document by associating at least one of the individual content elements with at least one of the individual layout elements, the at least one layout element defining layout features or placement information to be applied to the corresponding at least one content element in the different document, the different document being generated based on the different binding specification, the content elements, and the layout elements, wherein the different binding specification is stored separately from both the content and layout elements.

14. A medium storing a binding specification capable of configuring a machine to enable generation of documents based on the binding specification, a layout portfolio, and a content portfolio, the binding specification including global bindings and direct bindings that aid the formatter in formatting documents based on the binding specification, the content elements, and the layout elements, the binding specification stored separately from both the content portfolio and the layout portfolio.

15. The medium of claim 14 in which the global bindings include a list of element bindings that define a default binding for elements of a specified type.

16. The medium of claim 14 in which the global bindings include a list of model bindings that define a default model for a specified binding site.

17. The medium of claim 14 in which the binding specification contains composition sequences that aid the formatter in formatting documents, the composition sequences defining the order in which formatting is to proceed using bindings between content elements and layout elements, each of the composition sequences including composition blocks containing ordered lists of direct bindings.

18. The medium of claim 14 in which each of the direct bindings comprises a placement binding or a style binding.

19. A machine-based method comprising enabling storage of a binding specification that describes a document by associating individual content elements with individual layout elements, the layout elements defining layout features or placement information to be applied to the associated content elements in the document the document being generated based on the binding specification, the content elements, and the layout elements, the binding specification being stored separately from both the content and layout elements.

* * * * *

UNITED STATES PATENT AND TRADEMARK OFFICE
CERTIFICATE OF CORRECTION

PATENT NO. : 7,039,863 B1 Page 1 of 1
APPLICATION NO. : 09/360399
DATED : May 2, 2006
INVENTOR(S) : Joseph Pasqua, Daniel C. Brotsky and Perry A. Caro It is certified that error appears in the above-identified patent and that said Letters Patent is hereby corrected as shown below:

Column 22, line 31, after "describe", insert --a--.

Signed and Sealed this

Twenty-first Day of November, 2006

JON W. DUDAS
*Director of the United States Patent and Trademark Office*